United States Patent
Tian et al.

(10) Patent No.: US 9,663,840 B2
(45) Date of Patent: May 30, 2017

(54) 500 MPA GRADE LONGITUDINALLY-WELDED STEEL PIPE WITH LOW YIELD RATIO AND MANUFACTURING METHOD THEREFOR

(71) Applicant: BAOSHAN IRON & STEEL CO., LTD., Shanghai (CN)

(72) Inventors: Qingchao Tian, Shanghai (CN); Hongde Shi, Shanghai (CN); Huaizhong Wang, Shanghai (CN); Qijiang Wang, Shanghai (CN)

(73) Assignee: BAOSHAN IRON & STEEL CO., LTD, Shanghai (CN)

( * ) Notice: Subject to any disclaimer, the term of this patent is extended or adjusted under 35 U.S.C. 154(b) by 0 days.

(21) Appl. No.: 14/761,365

(22) PCT Filed: Oct. 9, 2013

(86) PCT No.: PCT/CN2013/084872
§ 371 (c)(1),
(2) Date: Jul. 16, 2015

(87) PCT Pub. No.: WO2014/114111
PCT Pub. Date: Jul. 31, 2014

(65) Prior Publication Data
US 2015/0361518 A1    Dec. 17, 2015

(30) Foreign Application Priority Data
Jan. 24, 2013  (CN) .......................... 2013 1 0027734

(51) Int. Cl.
| | | |
|---|---|---|
| C21D 8/10 | (2006.01) | |
| C21D 9/08 | (2006.01) | |
| C21D 6/00 | (2006.01) | |
| C22C 38/02 | (2006.01) | |
| C22C 38/14 | (2006.01) | |
| C22C 38/06 | (2006.01) | |
| C22C 38/04 | (2006.01) | |
| F16L 9/02 | (2006.01) | |
| B23K 31/02 | (2006.01) | |
| B21C 37/08 | (2006.01) | |
| F16L 9/17 | (2006.01) | |
| C22C 38/12 | (2006.01) | |
| C21D 8/04 | (2006.01) | |
| C21D 9/50 | (2006.01) | |

(52) U.S. Cl.
CPC .......... C21D 8/105 (2013.01); B21C 37/0811 (2013.01); B23K 31/027 (2013.01); C21D 6/008 (2013.01); C21D 8/0463 (2013.01); C21D 9/08 (2013.01); C21D 9/085 (2013.01); C22C 38/02 (2013.01); C22C 38/04 (2013.01); C22C 38/06 (2013.01); C22C 38/12 (2013.01); C22C 38/14 (2013.01); F16L 9/02 (2013.01); F16L 9/17 (2013.01); C21D 6/005 (2013.01); C21D 8/10 (2013.01); C21D 9/50 (2013.01); C21D 2211/004 (2013.01); C21D 2211/005 (2013.01)

(58) Field of Classification Search
CPC ... B21C 37/0811; B23K 31/027; C21D 6/005; C21D 6/008; C21D 8/10; C21D 8/105; C21D 9/085; C22C 33/04; C22C 38/02; C22C 38/04; C22C 38/06; C22C 38/12; C22C 38/14; F16L 9/02; F16L 9/17
See application file for complete search history.

(56) References Cited

FOREIGN PATENT DOCUMENTS

| | | | |
|---|---|---|---|
| CN | 101845586 A |  | 9/2010 |
| CN | 101914726 A | * | 12/2010 |
| CN | 102125937 A | * | 7/2011 |

(Continued)

OTHER PUBLICATIONS

Xie Hai-bo , Liu Xiang-hua , Wang Guo-dong, Zhang Zhong-ping Optimization and Model of Laminar Cooling Control System for Hot Strip Mills Journal of IRoN and Steel Research, Internmional. 2006 9 13(1) : 18-22.*

(Continued)

*Primary Examiner* — Jessee Roe
*Assistant Examiner* — Jenny Wu
(74) *Attorney, Agent, or Firm* — Quarles & Brady LLP

(57) ABSTRACT

A 500 MPa grade longitudinally welded steel pipe with a low yield ratio and a manufacturing method therefor, the components thereof by weight percentages being as follows: C 0.11%-0.16%, Si 0.15%-0.35%, Mn 0.8%-1.5%, V 0.06%-0.15%, Al 0.002%-0.04%, Ti 0%-0.05%, Nb 0%-0.05%, the balance being Fe and inevitable impurities, and the carbon equivalent Ceq being not more than 0.4%. According to the above component design, molten steel is subjected to smelting in a converter or electric furnace, and is cast into a slab; the slab is heated at 1,200° C.-1,300° C. and rolled into a plate strip, with the finished rolling temperature of the plate strip being between 840° C.-940° C.; the rolled plate strip is subjected to laminar flow cooling with a water curtain, the laminar flow cooling adopting the manner of rear-section cooling, and is coiled into a plate roll when being cooled to the temperature interval of 500° C.-560° C.; and after welding formation, a heat treatment on the welding seams is carried out at a heating temperature of 950° C.±50° C. The steel pipe of the present invention has the characteristics of an excellent welding property, a high strength and toughness, a low yield ratio and the like, and the yield strength thereof is greater than 500 MPa and the yield ratio thereof is less than 0.85.

1 Claim, No Drawings

(56) References Cited

FOREIGN PATENT DOCUMENTS

| | | | | |
|---|---|---|---|---|
| CN | 102127697 A | 7/2011 | | |
| CN | 102161148 A | 8/2011 | | |
| CN | 102242311 A | 11/2011 | | |
| JP | 2007119899 | * 5/2007 | ............ | C22C 38/00 |
| JP | 2007119899 A | 5/2007 | | |
| WO | 2010110490 A1 | 9/2010 | | |

OTHER PUBLICATIONS

PCT International Search Report, PCT/CN2013/084872, Jan. 16, 2014, 6 pages.

* cited by examiner

US 9,663,840 B2

500 MPA GRADE LONGITUDINALLY-WELDED STEEL PIPE WITH LOW YIELD RATIO AND MANUFACTURING METHOD THEREFOR

CROSS-REFERENCE TO RELATED APPLICATIONS

This application represents the national stage entry of PCT International Application No. PCT/CN2013/084872 filed Oct. 9, 2013, which claims priority of Chinese Patent Application No. 201310027734.4 filed Jan. 24, 2013, the disclosures of which are incorporated by reference here in their entirety for all purposes.

FIELD OF THE INVENTION

The present invention relates to a method for manufacturing a steel construction pipe, and in particular, to a longitudinally welded steel pipe having a low yield ratio, with the yield strength thereof being at 500 MPa grade, and having an excellent welding property, and a manufacturing method therefor.

BACKGROUND ART

Low carbon steels and low alloy steels with a yield strength of 235-345 MPa have been used in steel construction structures for a long time in China. At present, the yield strength grade of low alloy steel has been extended to 460 MPa in "Ministry of Construction of the People's Republic of China: Code for design of steel structures" GB 50017-2003. A steel construction pipe with a high strength grade is used to thin the section size of a steel structure and save investment, but a steel structure with a thin section is prone to have the problem of local and overall yield instability, thus limiting the thinning of the section size of a steel structure, resulting in that the advantages of a steel construction material with a high strength grade cannot be fully exploited. Therefore, an urgency for the development of the construction steel with a high strength grade is to solve the problem of yield instability of a steel structure with a thin section. A steel pipe with a thin section and a high strength grade is filled with concrete to form a high-strength steel pipe-concrete structure, where the steel pipe and concrete work together, and which can significantly increase the stiffness thereof, solving the problem of yield stability of the structure. Because a high-strength steel pipe-concrete structure can make full use of the advantages of a high-strength steel material and a high-strength concrete, and can save investment and accelerate the construction schedule, it is a technical growth point having the development potential for expanding the market of construction steels with high strength grades.

Compared with a seamless pipe, a welded pipe has the outstanding features of high production efficiency, good dimension precision, wide range of specifications, low cost and the like, and therefore, is the preferred type for manufacturers and oil field users, and is favoured by the market. The production process of an ERW casing includes: steelmaking, continuously casting, hot rolling into a plate roll, shearing and butt welding the plate roll end-to-end, forming into a plate strip, welding on-line, performing heat treatment on the welding seams or performing heat treatment on the whole pipes, processing the pipe, performing delivery inspection and so on. The process step of shearing and butt welding the plate roll end-to-end is the key process step for realising a multi-roll continuous production, which reflects the production efficiency of ERW welded pipes. However, it is required in the butt welding of a plate roll end-to-end that the carbon equivalent in the material must be low, otherwise it would be prone to cause strip breakage of a steel plate, seriously influencing the production efficiency. Furthermore, a high-strength steel pipe-centrifugal concrete member used as a construction pile foundation often bears a great impact load, and therefore it is required that the steel pipe has an excellent strength and toughness and a low yield ratio, and at the same time, it is also required that the welding seams thereof have excellent mechanical properties; consequently, the carbon equivalent Ceq of the material is required to be no greater than 0.4.

The Japanese patent JP 56035749 A proposed a method for an ERW casing, the components of the casing did not contain strengthening elements of Ti, Nb, V, Cr and the like. Although the requirement of a high strength could be satisfied, the Si content reached up to 1% so that grey spots were prone to form at the welding seams during welding, seriously affecting the quality of the welding seams, and the carbon equivalent reached up to 0.8, making the shearing and butt welding impossible.

In the Japanese patents JP 09029460 A, JP 54097523 A, JP 56069354 A and JP 59047364 A, Cu was added, and the requirements of producing a high-strength casing may also be satisfied, but since Cu is substantially insoluble in ferrite at room temperature and is precipitated in the form of $\epsilon$-Cu or face-centered cubic $\alpha$-Cu, the strengthened effect of steel has great sensitivity to the cooling rate, therefore making it difficult to stably control the properties of the hot rolled plate in the controlled rolling and controlled cooling process of the production of a hot rolled plate;

The Japanese patent JP 57131346 A provided a welded pipe with resistance to grooving corrosion, wherein, in order to reduce the generation of MnS, and based on controlling the content of S at a low level, more than one of Cu, Ni, Al and Cr, and even harmful elements of As, Sb, Sn, Bi and the like were added, or more than one of Ti, Nb, Zr, V and the like was further added, so that the requirement of a high strength and toughness of 500 MPa of the present invention cannot be achieved at all. The Japanese patents JP 58093855 A and JP 59096244 A both contained an expensive Ni element, causing the alloy cost to be relatively high; and in addition, the Japanese patents JP 57131346 A and JP 58093855 A had relatively high Si contents, making it difficult to obtain excellent properties of the welding seams. Although the steel types involved in the Chinese patents CN 200710038400.1 and CN 200310104863 can achieve the performance requirements of a high strength and a low yield ratio, due to the high content of C and a carbon equivalent of greater than 0.4, they can only meet the requirements of the shearing and butt welding, enabling the production to proceed continuously, but it is difficult to obtain excellent properties of the welding seams, so that the great impact load borne by a pile pipe could not be withstood. The steel type provided in the Chinese patent CN 200310104863 can also satisfy the 500 MPa requirement; however, because the components were too simple, it only achieved the required mechanical properties under a coiling temperature of 430° C.-470° C. Under such a low coiling temperature, it is more difficult to realise the stable control of the properties of a hot rolled plate.

SUMMARY OF THE INVENTION

The objective of the present invention is to provide a 500 MPa grade longitudinally welded steel pipe with a low yield ratio and a manufacturing method therefor, which satisfies the characteristics of a construction pile foundation bearing a load and having the characteristics of an excellent welding property, a high strength and toughness, a low yield ratio and the like, with the yield strength thereof being greater than 500 MPa and the yield ratio thereof being less than 0.85.

In order to achieve the above objective, the technical solution of the present invention lies in that:

in material design, the present invention adopts a low carbon content, maintains a proper Mn content, and adds appropriate amounts of micro-alloy elements of V, Ti, Nb and the like, through the effects of which, in the controlled rolling and controlled cooling process, the strength is increased, so as to obtain a steel pipe with a high strength and toughness, and a low yield ratio.

In particular, for the 500 MPa grade longitudinally welded steel pipe with a low yield ratio of the present invention, the weight percentages of the components thereof are as follows:

C 0.11%-0.16%
Si 0.15%-0.35%
Mn 0.8%-1.5%
V 0.06%-0.15%
Al 0.002%-0.04%
Ti 0%-0.05%
Nb 0%-0.05% the balance being Fe and inevitable impurities; and the carbon equivalent Ceq being not more than 0.4%.

In the component design of the present invention:

it is designed that the carbon equivalent Ceq of the components is not greater than 0.4%, which not only meets the requirements of shearing and butt welding, but can also obtain excellent properties of the welding seams.

For C, as the C content increases, the welding property is reduced, and consequently, by weight percentages, the C content should not be greater than 0.16%, but an excessively low C content will be detrimental to the strength of the material, and therefore the carbon content should be 0.11%-0.16%.

Si is solid-solved in ferrite in order to improve the yield strength of the steel, and the content thereof should not be too high and should be controlled at 0.15%-0.35%.

Mn is mainly dissolved in ferrite for use in strengthening and for improving the strength of the ferrite, but when the Mn content is too high, segregation becomes serious and martensite will be generated locally, therefore the Mn content should be 0.8%-1.5% by weight percentage.

For V, vanadium carbonitrides are precipitated from ferrite with the functions of stabilising ferrite and postponing the bainite phase transformation, being capable of improving the strength of the material in the controlled cooling process, while improving the mechanical properties of the welding seams, and therefore, the V content should be 0.06%-0.15% by weight percentage.

Al is a traditional element for deoxidation and nitrogen fixation, forms AlN, can refine austenite grains, is beneficial for improving the toughness of the material, and therefore should be adopted at a content of 0.002%-0.04% by weight percentage.

Ti is a strong carbonitride-forming element, and the TiN and TiC formed can refine austenite grains in both the soaking and the reheating processes, improving the mechanical properties of the welding seams; and if the content thereof is too high, it is prone to form coarse TiN, which would not achieve the purposes of the addition thereof. By weight percentage, the Ti content should be 0%-0.05%.

Nb is a strong carbonitride-forming element, can delay the recrystallisation of austenite during hot rolling in order to refine grains, can hinder the growth of austenite grains in the reheating process, thereby improving the strength and toughness of the material, and should be adopted at a content of 0%-0.05% by weight percentage.

According to the above design schema of the alloy, molten steel is subjected to smelting in a converter or electric furnace, and is cast into a slab; the slab is heated at 1,200° C.-1,300° C. and rolled into a plate strip, with the finished rolling temperature of the plate strip being between 840° C.-940° C.; the rolled plate strip is subjected to laminar flow cooling with a water curtain, the laminar flow cooling adopting the manner of rear-section cooling, with the number of closed cooling water valves in the front section accounting for 15%-40% of the total number of cooling water valves, is cooled to the temperature interval of 500° C.-560° C. within 30 s, is coiled into a plate roll and is stacked for slow cooling; and after welding formation, a heat treatment on the welding seams is carried out at a heating temperature of 950° C.±50° C.

The chemical components of the present invention belong to micro-alloyed carbon manganese steel. Alloy elements are fully solid-solved in austenite in a rolling temperature range of 1,300° C.-840° C. The rear-section cooling manner is favourable for the growth of austenite grains, and the rapid cooling with a water curtain suppresses the precipitation of carbides and the occurrence of phase transformation from austenite to ferrite pearlite, so that the phase transformation and precipitation of carbides in the supercooled austenite centralise at a coiling temperature of 500° C.-560° C., thereby obtaining a micro-structure of ferrite and fine carbides in dispersed distribution, ensuring that the material has the features of a high strength as well as a low yield ratio.

The present invention has the following beneficial effects:

the carbon equivalent of the alloy components of the present invention is low, and the alloy content is low; it does not contain expensive alloy elements of Mo, Ni and the like; only heat treatment on the welding seams is needed, and the production cost of a steel pipe is less expensive, having significant economic and social benefits.

DETAILED DESCRIPTION OF THE INVENTION

The present invention will be further described hereinafter in combination with embodiments.

The components of the embodiments of the present invention can be found in Table 1, wherein Fe is the balance. The manufacturing methods and properties of the embodiments of the present invention can be found in Table 2.

TABLE 1

| | | | | | | | unit: % by weight | |
|---|---|---|---|---|---|---|---|---|
| | C | Si | Mn | V | Al | Ti | Nb | Ceq |
| Example 1 | 0.11 | 0.15 | 1.50 | 0.12 | 0.040 | 0.01 | — | 0.38 |
| Example 2 | 0.13 | 0.30 | 1.11 | 0.10 | 0.020 | — | 0.02 | 0.34 |
| Example 3 | 0.12 | 0.35 | 1.42 | 0.15 | 0.002 | 0.02 | — | 0.39 |
| Example 4 | 0.16 | 0.25 | 0.80 | 0.06 | 0.010 | — | 0.05 | 0.31 |
| Example 5 | 0.14 | 0.20 | 0.92 | 0.09 | 0.030 | 0.05 | 0.01 | 0.31 |
| Comparative Example 1 | 0.13 | 0.30 | 1.20 | — | 0.02 | — | 0.02 | 0.34 |
| Comparative Example 2 | 0.19 | 0.35 | 1.20 | 0.12 | 0.02 | — | — | 0.41 |

TABLE 2

|  | Finished rolling temperature ° C. | Water curtain cooling times | Coiling temperature ° C. | Rt 0.5 MPa | Rtm MPa | Yield ratio | 0° C. full-scale impact energy/J | Proportion of the number of closed cooling water valves in the front section to the total number of cooling water valves |
|---|---|---|---|---|---|---|---|---|
| Example 1 | 940 | 28 | 550 | 510 | 655 | 0.78 | 115 | 15% |
| Example 2 | 900 | 15 | 560 | 545 | 660 | 0.83 | 120 | 24% |
| Example 3 | 880 | 23 | 510 | 535 | 680 | 0.79 | 105 | 29% |
| Example 4 | 850 | 12 | 540 | 540 | 645 | 0.84 | 110 | 37% |
| Example 5 | 840 | 15 | 500 | 550 | 670 | 0.82 | 130 | 40% |
| Comparative Example 1 | 870 | 22 | 500 | 430 | 500 | 0.86 | 120 |  |
| Comparative Example 2 | 900 | 25 | 550 | 580 | 710 | 0.82 | 40 |  |

As shown in Table 2, by adopting the chemical component design and production process system of the present invention, the yield strength of the material was greater than 500 MPa, the yield ratio was less than 0.85, the 0° C. full-scale impact energy was greater than 100 J, and the mechanical properties thereof were stable.

After shearing and butt welding, plate roll forming and ERW pipe making, an ERW high-strength steel pipe was produced through the production processes of heat treatment on welding seams and the like, and the strengths of examples 1-5 all met the requirement of the yield strength of greater than 500 MPa. Comparative example 1 had simple components and did not contain the element V, thus being incapable of achieving the requirement of the yield strength of greater than 500 MPa at the coiling temperature of the present invention; comparative example 2 had a higher C content, and the impact toughness of the material decreased significantly, being incapable of meeting the strict requirements for impact load of the steel for a construction pile foundation. It can be seen that with the designed chemical components and process system of the present invention, ERW steel pipes meeting the high property requirement of the yield strength of greater than 500 MPa can be stably produced.

The invention claimed is:
1. A method of manufacturing a longitudinally welded steel pipe comprising
 a) 0.11 wt %-0.16 wt % carbon (C);
 b) 0.15 wt %-0.35 wt/o silicon (Si);
 c) 0.8 wt %-1.5 wt % manganese (Mn);
 d) 0.06 wt %-0.15 wt % vanadium (V);
 e) 0.002 wt %-0.04 wt % aluminum (Al);
 f) 0 wt %-0.05 wt % titanium (Ti);
 g) 0 wt %-0.05 wt % niobium (Nb); and
 h) a balance of iron (Fe) and inevitable impurities;
 wherein the steel pipe has a carbon equivalent (Ceq) of <0.4%, and the steel pipe exhibits a yield strength of greater than 500 MPa, a yield ratio of less than 0.85 and a 0° C. full-scale impact energy of greater than 100 J;
the method comprising:
 a) smelting molten steel;
 b) casting the smelted steel into a slab;
 c) heating the slab to a temperature of 1200° C.-1300° C.;
 d) rolling the heated slab into a plate strip at a temperature of about 840° C.-940° C.;
 e) laminar flow cooling the rolled plate strip with a water curtain, the laminar flow cooling adopting the manner of rear-section cooling, with the number of closed cooling water valves in the front section accounting for 15%-40% of the total number of cooling water valves, and cooling the strip to the temperature interval of 500° C.-560° C. within 30 seconds;
 f) coiling the cooled strip into a plate roll;
 g) welding the plate roll into a pipe; and
 h) heat treating welding seams of the welded pipe at a heating temperature of 950° C.±50° C.

* * * * *